3,207,740
PROPYLENE POLYMERIZATION BY TITANIUM TRICHLORIDE, ALUMINUM DIALKYL HALIDE AND WATER
Harry A. Cheney, Berkeley, Calif., assignor to Shell Oil Company, New York, N.Y., a corporation of Delaware
No Drawing. Filed May 27, 1963, Ser. No. 283,534
9 Claims. (Cl. 260—93.7)

This invention relates to the polymerization of alpha-olefins to produce highly stereoregular polymers. More particularly, it relates to an improved process for controlling the polymerization of propylene.

It is known that alpha-monoolefins can be polymerized at relatively low temperatures and pressures to produce polymers which are linear and, in the case of propylene and higher olefins, highly stereoregular in structure. A substantial body of art in this field is summarized in the book, "Linear and Stereoregular Addition Polymers," by Gaylord et al., Interscience Publishers, Inc., New York, 1959, and in recent literature and patents. The methods for carrying out such polymerizations are generally referred to as "low pressure" methods. Known effective catalysts for these polymerizations are species or modifications of so-called Ziegler catalysts. Broadly, stereoregulating catalysts are two-component systems comprising a compound of the left-hand subgroups of Groups IV–VI or Group VIII of the Mendeleev Periodic Table and a Group I–III element or alloy or hydride or organic derivative having an organometallic bond. Combinations of certain selected compounds of the two types are particularly adapted for the production of stereoregular polymers of propylene which are characterized by extremely high crystallizability.

"Crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though substantially less than 100%, e.g., as little as 50%, of the polymer is crystalline or crystallizable. A crystallinity of 70%, as determined by X-ray analysis or similar methods, is extremely high for stereo-regular polypropylene. In general, polypropylene having a crystallizability of this order contains at most only a small proportion of material which is extractable in hydrocarbons, such as paraffins of $C_5$ to gasoline boiling range. Typically, the proportion of highly crystalline polypropylene which is extractable in isopentane, heptane, or isooctane is less than 10% and it can be less than 5%. The hydrocarbon soluble portion of such polymers is generally completely atactic material, i.e., is not stereoregular. It may also have a lower molecular weight than the hydrocarbon insoluble portion.

Some of the outstanding advantages of polypropylene are directly associated with its degree of crystallinity, which, in turn, is a function of stereoregularity as well as crystallization conditions. Properties directly associated with crystallinity are tensile strength and hardness. The present invention is directed to a process for production of polypropylene and similar polymers having a controlled, high stereoregularity and crystallizability.

Unless otherwise stated, the terms crystallinity and crystallizability herein refer to these properties as indicated by the percentage of polymer insoluble in isopentane at room emperature. Percentage insoluble in isopentane is calculated as 100 minus "isopentane solubles," which is determined as follows:

A 25 g. sample of powdered polymer is placed in a 500-ml. glass-stoppered flask. After addition of 200 ml. of isopentane, the flask is shaken periodically for 10 minutes at 70° F., and the contents are filtered. Two additional 100-ml. portions of isopentane are used to rinse the flask twice and twice reslurry the filter cake. The filtrate is evaported on a steam bath, and the residue from the evaporation is taken as "isopentane solubles."

The viscosity average molecular weight of normally solid, crystalline polypropylene usually is at least about 40,000 and is generally between 100,000 and 1,200,000. For convenience the molecular weight is usually expressed in terms of intrinsic viscosity (I.V.). Intrinsic viscosity of polypropylene, measured in decalin at 150° C., is generally between 1.0 and 6 dl./g. but may be as low as 0.5 or less and as high as 10 or more.

Polypropylene is the only stereoregular olefin polymer which has achieved substantial commercial importance to date. The present invention is particularly concerned with an improved method for producing polypropylene of higher crystallinity than normally achievable with a particular, selected catalyst. While the advantages of the present invention may also be obtained when other alpha-olefins are similarly polymerized, the invention is of particular advantage in the production of polypropylene and will be described in terms of propylene polymerization.

As will be shown, the process of this invention permits control of propylene polymerization to increase crystallinity of the product, as indicated by insolubility in hydrocarbons, by as much as several percentage points in the range above 90%. In this range an increase of as little as one-half percentage point or even less can be very significant in providing a commercially important improvement in properties which are associated with crystallinity.

When a product has a high content of hydrocarbon soluble components, its properties associated with low hydrocarbon insolubles content can be improved, of course, by extracting the soluble portion. This commonly used expedient is, however, undesirable both because of the added expense of extraction and the relatively low commercial value of the extract. This invention is directed to a process in which the catalyst is selected and conditions are controlled such that the resulting polymer contains less than 6% hydrocarbon-soluble component and is thus in the commercially acceptable range without extraction.

This invention provides a valuable improvement in the processes for the production of stereoregular polypropylene in which solid polymer is separated from liquid hydrocarbon reaction diluent and other associated liquids by filtration or centrifuging. According to this invention, the proportion of low value hydrocarbon-soluble component which remains dissolved in the filtrate during filtration or centrifuging is decreased. The invention is of particular value in processes in which polymer is directly dried without intervening solids-liquid separation, as described, for example, in U.S. 3,040,015 to Cheney et al. In said process of Cheney et al., solid polypropylene is recovered from a slurry which contains substantially all hydrocarbon material of the reaction mixture by vaporizing the liquid components of the slurry at temperatures below the melting point of polypropylene. When such a recovery method is employed all hydrocarbon soluble material which is formed in the polymerization remains in the polymer.

It is an object of this invention to provide an improved method of producing polypropylene of a controlled high degree of crystallinity. It is a specific object to provide a method for increasing the crystallinity of polypropylene produced with highly purified reaction mixture components and with a catalyst which results from combining an active form of titanium trichloride and an aluminum dialkyl halide. Other objects of this invention will appear from the following description thereof.

Briefly stated, this invention provides a method for polymerizing an alpha-monoolefin, capable of forming a crystalline stereoregular polymer, in a liquid reaction mixture to which are added as essential catalytic ingredients a catalytically active form of titanium trihalide and an aluminum dialkyl monohalide, in which the crystallinity of the resulting polymer is controlled to a desired high value by contacting the aluminum alkyl halide component of the catalyst with a predetermined controlled amount of water in a narrow range, generally between 0.02 and 1.0 mole of water per mole of aluminum dialkyl halide, sufficient to react with only part of said aluminum dialkyl halide. The time during which the aluminum dialkyl halide component of the catalyst is in contact with water prior to contact with titanium trihalide is held below about 10 minutes and is preferably no more than about 1 minute and most preferably 0 to 15 seconds. The time of 0 to 15 seconds encompasses the most preferred case, in which water is added separately to the polymerization reaction zone which contains the total reaction mixture, including all catalyst components, as hereinafter described in greater detail. It should be understood that in the above description of the invention the amount of aluminum dialkyl halide referred to is the total charged to the reactor. As explained below, it is theorized that the preferred modification of aluminum alkyl halide, resulting from contact of water and aluminum dialkyl halide as charged to the process, is a fugitive intermediate, completely formed within 15 to 150 seconds of initial contact of aluminum alkyl halide and water, and disappearing at a somewhat slower rate.

More specifically, according to this invention, propylene is polymerized at a temperature in the range from 0° to 120° C. in a liquid reaction mixture which comprises a non-reactive hydrocarbon diluent and, as essential catalytic ingredients, the product of admixing a catalytically active form of titanium trichloride, an aluminum dialkyl chloride and a controlled amount of water (water being admixed with the aluminum dialkyl chloride within 0 to 10 minutes prior to the time at which aluminum dialkyl chloride is combined with titanium trichloride, including contact in the reaction mixture itself by separate addition of controlled amounts of water thereto), the amount of water being within the above-mentioned range at a predetermined value which is effective to modify the catalytic properties of the reaction mixture in such a fashion that the resulting polypropylene has a crystallinity, characterized by insolubility in isopentane which is higher than that obtained by similarly adding either a substantially lower or a substantially higher proportion of water at otherwise identical reaction conditions.

In a large number of runs carried out prior to this invention it was found that titanium trihalide-aluminum dialkyl halide catalysts are capable of polymerizing propylene to a product containing a very high proportion of material insoluble in isopentane. It was also found, however, that the proportion of polymer insoluble in isopentane could vary by as much as 5% or more (basis total polymer) even though no deliberate change had been made in reaction conditions or catalyst composition.

Among other measures to overcome this difficulty, steps were taken to provide extremely careful control of the amount of water present in the components entering the reaction mixtures.

It has been generally taught that water is a harmful ingredient in propylene polymerization mixtures and that it should therefore be removed from all feedstocks, solvents and other reaction components. Carefully considering the complete state of the art at the time the present invention was made, nothing was known which would lead one to expect the substantially complete absence of water to have an adverse effect on the stereoregulating ability of the catalysts used in this invention. It was therefore completely unexpected to find that in highly purified and extremely dry reaction systems in which the amount of water in the combined ingredients of the total reaction mixture was as low as 0.2 part per million or less, polypropylene of substantially lower crystallinity was generally produced than had been produced in earlier, less completely purified systems. In further careful studies it was subsequently developed that, to obtain the best polymer crystallinities, it is essential that the amount of water which contacts the aluminum alkyl halide component of the catalysts of this invention be a controlled amount in a predetermined narrow range between 0.02 and 1.0 mole per mole of aluminum dialkyl halide. For any given temperature in the range between 40° and 80° C. the critical range of water concentration is still narrower, the difference between the upper and lower limit of the most effective range being generally less than 0.1 mole per mole aluminum dialkyl halide when water is added to the combined reaction mixture.

When less than the required small, critical amount of water is present, the resulting polymer has an undesirably low crystallinity. When the amount of water present is excessive, this not only has the adverse effect of reducing the crystallinity of the polymer but it substantially reduces the reaction rate and ultimately kills the reaction entirely. The reaction product of aluminum dialkyl halide and water which acts to provide the superior results of this invention appears to be an intermediate, fugitive product which, upon prolonged standing, is converted to a catalytically inactive form. Hence the preference for adding the controlled amount of water directly to the reaction mixture.

While this invention is particularly directed to the production of homopolymers of propylene of high crystallinity, having an isopentane solubles content below about 5%, it is also applicable to the production of improved block copolymers consisting predominantly of polypropylene, e.g., to the extent of 90%, which are produced with the above-described catalysts under conditions in which a large proportion of the reaction is carried out with only propylene feed. The advantages of the present invention may also accrue when the same catalysts are employed in the polymerization of higher alpha-monoolefins which are known to produce crystallizable stereoregular polymers, e.g., butene-1, 3-methylpentene-1, 4-methylpentene-1, and the like.

The catalysts employed in the process of this invention are the products of combining in a hydrocarbon medium a catalytically active form of titanium trichloride, and a suitable aluminum dialkyl halide modified with a small, controlled amount of water. The catalytically active form of titanium trichloride is preferably produced by reducing titanium tetrachloride by contact with an aluminum alkyl, which may be an aluminum trialkyl compound or an aluminum dialkyl halide, in the required stoichiometric amount to reduce the titanium tetrachloride to titanium trichloride. It is described in some detail, for example, in U.S. Patent 2,971,925 to Winkler et al. The resulting form of titanium trichloride, depending on the conditions under which the reduction is carried out, is either brown or purple in color; it may be the form generally known as beta-$TiCl_3$ or that generally known as gamma-$TiCl_3$, complexed with aluminum and chloride ions. Such complexes may be referred to as titanium trichloride-aluminum chloride complexes. They do not necessarily contain the metals in integral mole ratios. Active titanium trichloride-aluminum chloride complex can also be produced by reducing titanium tetrachloride by contact with a reducing metal, such as aluminum.

The preferred aluminum dialkyl halide used in this invention is aluminum diethyl monochloride. Other dialkyl halides, in which the alkyl groups have from 3 to 6 or more carbon atoms and preferably are propyl, isopropyl or isobutyl, may also be employed. While chlorine is the preferred halogen, the bromide or iodide may also be employed.

The titanium trichloride is preferably employed in concentrations ranging from 25 p.p.m. to 1000 p.p.m. Useful results are also obtained in the broader range from 5 p.p.m. to 1%. Parts and percentages are by weight, based on the total reaction mixture, including diluent.

Useful molecular proportions of aluminum dialkyl halide to active titanium trichloride in the catalysts of this invention are in the range from 1:1 to 5:1. Use of higher proportions of aluminum dialkyl halides is not disadvantageous but provides no further advantages. Ratios from 2:1 to 3:1 are preferred.

The conditions under which the reaction takes place are conventional for the polymerization of propylene or other alpha-monoolefins with titanium trihalide-aluminum dialkyl halide catalysts. The pressure is generally between atmospheric and 500 p.s.i. It is in part a function of the temperature and of the solvent employed. The temperature is, in order of increasing preference, in the range from 0 to 120° C., from 20° to 100° C., from 40° to 80° C., and from 40° to 60° C. At the lower temperatures in these ranges, product of higher crystallinity is produced but the reaction rate is relatively lower. In selecting a reaction temperature, a compromise is struck between these two effects.

The polymerization reaction is carried out in liquid phase in an agitated system in which catalyst and polymer product are present in suspension as finely divided particles. It is generally preferred to dilute the monomer with an inert liquid in which it is soluble, but the polymer is insoluble. Suitable diluents are saturated aliphatic hydrocarbons preferably having 3 or more carbon atoms per molecule, e.g., propane, butane, petroleum ether, pentanes, hexanes, heptanes, octanes, or other gasoline boiling range hydrocarbons, or relatively aromatics-free kerosene fractions. Light paraffinic hydrocarbon diluents, boiling below about 150° C., and preferably below 50° C., at the pressure prevailing in the drying system are used when direct evaporative drying is employed.

Propylene adidtions, reaction conditions, and slurry withdrawal are suitably correlated to maintain in the reaction mixture between 5 and 40% unreacted monomer and between 5 and 35% polymer. Heat of reaction is removed, suitably by direct cooling, e.g., evaporation of light components of the reaction mixture.

Compounds which modify the action of the catalyst, particularly for the purpose of molecular weight control, may be present in the reaction mixture. For example, hydrogen or a zinc dialkyl, such as zinc diethyl, may be added to limit the molecular weight of the polymer. The functions and methods of use of such modifiers are known.

The process is conducted in an inert atmosphere. This is preferably accomplished by first sweeping out the reaction zone with an inert fluid, e.g., an inert gas such as nitrogen, methane or the like. This may be followed by a portion of the hydrocarbon diluent to be employed, suitably containing some aluminum alkyl compound for the purpose of removing traces of remaining moisture.

In order to maintain controllability it is essential for successful operation of the process that the reaction vessel and all the components of the reaction mixture be carefully dried and precautions maintained during the reaction to prevent any moisture from entering the reaction mixture in uncontrolled fashion. All the components of the reaction mixture must be sufficiently dry so that the total amount of moisture in all components which reaches the reactor, exclusive of deliberately added water, is accurately known and less than the amount required for control of catalyst properties. Preferably the feeds are dried so that they contain less than 0.5 and most preferably no more than 0.2 p.p.m. of water. It is important to use extremely effective drying methods, such as, for example, distillation, or contact with alumina, calcium hydride, aluminum alkyl, molecular sieves, sodium, or the like or combinations of such drying methods, to reduce the water content of all reactant and diluent streams which enter the reaction mixture.

It is equally important that all other impurities be reduced to very low concentrations. For example, it is desirable that the ingredients of the reaction mixture, as charged, contain a total of less than 1 p.p.m. of sulfur (sulfur may be present in the form of $H_2S$, COS, and organic compounds such as mercaptans, thioethers, alkyl disulfides and the like), less than 10 p.p.m. of acetylenic compounds, less than 1 p.p.m. of organically combined oxygen, and less than 10 p.p.m. of free oxygen.

The amount of water which is employed to achieve the results of this invention is in the range from 0.2 to 1 mole of water per mole of aluminum dialkyl halide ($AlR_2X$). Best results are obtained at the preferred reaction conditions with 0.09 to 0.3 mole of water per mole of $AlR_2X$. The amount of water is correlated with the temperature maintained in the reactor, amounts in the higher part of the stated range being employed at the higher temperatures in the range, and with the time of contact of water and $AlR_2X$ prior to contact of the product with titanium trichloride, as illustarted below.

The amount of water used according to this invention, as expressed in relation to the total reaction mixture, is usually in the range between 2 and 10 parts per million, i.e., between 0.0002 and 0.001% by weight, when the preferred catalyst concentrations are employed. Thus, the reaction mixture is still substantially anhydrous even with the maximum tolerable amount of water present.

Providing for the addition of these small amounts of water as such to the total reaction mixture in a continuous or semi-continuous manner and for distribution thereof in the large reaction mass would be extremely difficult. It is, therefore, generally preferred to add water to the reaction mixture by means of a solution of water in a suitable hydrocarbon solvent. Preferably the solvent employed for water addition is the same as one of the hydrocarbon components of the reaction mixture, e.g., the reaction diluent, or the diluent employed in catalyst preparation, or a portion of the olefin reactant. The concentration of water in the water-carrying stream is controlled to a known value, which is preferably less than its saturation value and may be typically in the range of 100 to 500 p.p.m. of water.

It has been found that when water is added to a stream in which aluminum alkyl halide is present, prior to the stream entering the polymerization reactor, a portion of the added water is not effective in producing the desired catalyst modification; for example, when water and aluminum alkyl are combined for about one minute before addition to the reaction mixture, about twice as much water must be added as would be required when water and aluminum alkyl halide enter the reaction mixture separately. More prolonged contact would use up further amounts of added water.

While the addition to the titanium trichloride-aluminum chloride complex of small amounts of water, e.g., below 0.01 mole per mole $TiCl_3$, can be of advantage, it is preferred to avoid contact of the $TiCl_3$ component of the catalyst with the total added controlled amount of water prior to contact of said complex with the aluminum dialkyl halide component. To obtain the benefit of this invention it is important that water as such come in contact with the aluminum dialkyl halide.

It should also be understood that water, added in accordance with this invention, generally reacts completely with ingredients of the reaction mixture, and thus can no longer be identified as water in the reaction mixture or effluent by known analytical methods.

In the preferred mode of practicing this invention, an agitated reaction vessel is provided in which a reaction mixture is maintained under pressure for a sufficient length of time to polymerize propylene or other alpha-monoolefin to the desired product. A suitably diluted olefin feed is continuously fed into the reactor. Catalyst components are preferably separately charged to the reactor in amounts required to maintain the desired concentration of active catalyst. A portion of the total reaction mixture is continuously withdrawn for the removal of polymer and possible recycle of the monomer and diluent components.

The crystallinity of the product resulting from carrying out the polymerization reaction in the complete absence of water and in the presence of different controlled amounts thereof may be determined in preliminary experimental runs, or it may be determined by initiating the reaction without water addition and thereafter adding water at various rates or it may be known from previous experience. In order to produce polymer of the desired high crystallinity, water is then suitably added during the course of the reaction by introducing into the reactor a hydrocarbon stream containing a known amount of water. This can be achieved by passing a slip stream of dry, treated hydrocarbon feed or diluent, together with a precisely controlled flow of water in the desired ratio, e.g., 200 parts of water per million parts of hydrocarbon, through a suitable mixing device at approximately the temperature of the polymerization reaction or at a somewhat higher temperature. It is preferred to constantly produce a stream of a fixed water concentration, substantially below the saturation value of the carrier hydrocarbon, and to control the water content in the reactor by varying the total amount of this stream which is permitted to enter the reactor. Preferably the stream of controlled water content is introduced directly into the reaction zone where it is quickly mixed with the total reaction mixture and maintains the desired crystallinity of the polymer product.

Although the above-described method for controlling water addition is much preferred for convenient operation, alternative methods may be employed. For example, the total concentration of water in one of the streams entering the reaction mixture may be carefully controlled to provide just the required amount of water, e.g., by incompletely drying the stream in question in a controlled manner or by splitting one of the streams into two portions, drying one portion completely and drying the other to a controlled water concentration sufficient to provide the required amount. Other suitable methods of controlled water addition may occur to the person skilled in the art.

Conventional methods may be employed for catalyst deactivation in the withdrawn reaction mixture, removal of catalyst residue and recovery of polymer from the reaction mixture. Typically the catalyst is deactivated and converted to water soluble form by addition of a polar compound such as an alcohol, e.g., methanol, ethanol or isopropanol, suitably with a small amount of dry HCl. This may be followed by aqueous washes, e.g., with pure water, to remove the solubilized catalyst residues. Polymer may be separated and recovered by solids-liquid separation methods, e.g., filtration and drying, or by direct vaporization of diluent from the washed slurry, e.g., spray drying, or the method of Cheney et al., U.S. 3,040,015. Direct vaporization is carried out at temperatures below about 160° C., and suitably below 140° C. The range of 100° C. to about 140° C. is suitable.

While it is not known with certainty in what manner water acts to modify the stereoregulating ability of the catalysts used in this invention, it is thought that the water interacts with the aluminum alkyl halide component to provide a modified aluminum alkyl halide which in turn interacts with the titanium halide and thus leads to the improved products. It is believed that the following equation illustrates the overall reaction scheme which leads to the desired modified aluminum alkyl:

(1) $AlR_2X + H_2O \rightarrow AlEtX(OH) + RH$

The above is believed to be a relatively rapid reaction, which is typically completed in from 15 to 150 seconds after contact of water with aluminum alkyl. When water is added to the aluminum alkyl component before it enters the reaction mixture, more time is generally available for further reaction and it is believed that the following competitive reaction then takes place more slowly and converts the desired modified aluminum alkyl into a relatively inactive form.

(2) $AlRX(OH) + AlR_2X \rightarrow (AlAX)_2O$

This is believed to explain why addition of water is more effective when it is made directly to the reaction mixture than when water is added to the aluminum alkyl component.

The invention will be further illustrated by means of the following examples. The examples are only for the purpose of illustrating the practice of this invention and the observed effects of water addition, and are not to be considered a limitation of the invention.

EXAMPLE 1

*Preferred method illustrated*

Raw feed is a mixture of propylene and paraffin hydrocarbon, saturated with water and containing less than 5 p.p.m. of sulfur, less than 10 p.p.m. of isopropyl alcohol, and negligible amounts of any other impurities known to be harmful. This mixture is dried by contact in series with two thorough drying agents, and is then treated to remove any traces of acetylenic or diolefinic substances, and to remove oxygen and any other low-boiling components. Oxygen content of the treated mixture is less than 0.01 p.p.m. Water cannot be detected in the completely purified feed by methods sensitive to 0.2 p.p.m. Sulfur concentration is below 0.1 p.p.m.

An active gamma titanium trichloride-aluminum chloride catalyst is used which is prepared by adding a solution of triethylaluminum in a paraffinic hydrocarbon to a solution of titanium tetrachloride in a stirred autoclave until a Ti/Al ratio of 0.35 is reached. The mixture is then heated to above 100° C. and held for at least 30 minutes, after which it is cooled to ambient temperature. The resulting catalyst component is essentially a slurry of particles of gamma titanium trichloride-aluminum chloride complex in paraffinic hydrocarbon. Small amounts of this slurry are injected into the reactor as needed to maintain the polymerization rate.

In order to introduce water into the reactor, a side stream of the purified feed is passed as liquid upward through a bed of ceramic Raschig rings. A water level is maintained in the bed by injection of water. The water content of the contacted sidestream is measured using a phosphorus pentoxide electrolytic cell. The wet sidestream is added to the hydrocarbon feedstream ahead of the reactor and the amount of the sidestream is adjusted to maintain 2.3 p.p.m. of water in the adjusted combined feedstream. Water content of the adjusted feed is checked by an analytical technique which is sensitive to 0.2 p.p.m.

Polymerization is carried out in a continuous single-stage, well-mixed reactor at 60° C. The titanium catalyst and diethylaluminum chloride co-catalyst are added through separate lines at a rate to give a steady state slurry concentration of 14.7% by weight. Hydrogen is added to the reactor feed to maintain the desired molecular weight.

The slurry from the reactor is fed to a catalyst deactivating zone wherein it is contarcted with isopropyl alcohol and anhydrous hydrogen chloride. Next, the slurry is mixed with water, and the water thereafter separated from the slurry. Then the liquid hydrocarbon is evaporated from the solids, leaving all hydrocarbon soluble residues with the polymer., The recovered powder is pressed into sheets and after suitable aging its crystallinity is determined to be 67% by the torsion damping method described by F. E. Weir, SPE Transactions, October 1962, p. 302.

The intrinsic viscosity of the polymer, determined in decalin at 150° C., is 2.10 dl./g. The isopentane solubles value determined on the powder is 3.4% w.

EXAMPLE 2

Alternative method illustrated

The operation described in Example 1 is repeated except that the diethylaluminum chloride co-catalyst is not added to the reactor through a separate line. Instead, it is added to the feed stream ahead of the reactor but downstream of the point where water is added. In this case the adjusted feed contains 3.7 p.p.m. water.

Polymer concentration is 10.4% w. in the slurry leaving the reactor. Crystallinity of the product is 65%. Intrinsic viscosity is 2.3 dl./g., and the isopentane solubles value 4.0%.

EXAMPLE 3

Effect of water on crystallinity

A series of polymerizations are carried out at 60° C. according to Example 1, at various $H_2O:AlEt_2Cl$ ratios. The variation of isopentane solubles with said ratio is shown in Table 1. The solubles reach a minimum of 3.3% at a ratio of 0.15. To maintain a crystallinity corresponding to at least 96% pentane insolubes, $H_2O:AlEt_2Cl$ ratios from about 0.07 to about 0.26 are used.

EXAMPLE 4

Effect of water on reaction rate

Although the addition of water in accordance with this invention provides a substantial benefit in improved product crystallinity, as has been illustrated, it causes a steady decline in reaction rate. No range of water concentration was found in which addition of water increased the reaction rate. Fortunately, the amount of water required to obtain the benefit of increased crystallinity is sufficiently small so that the adverse effect on reaction rate is relatively slight. Table 3 presents the relationship of reaction rate to water:aluminum alkyl ratio, as read from graphs obtained by plotting the results of a number of runs carried out in accordance with Examples 1 and 2, at 60° C.

The reaction rate constant, $k$, is determined from the equation $$k = \frac{w}{cm}$$

where $w$ = grams polymer produced per hour,
$c$ = grams titanium trichloride in polymerizer,
$m$ = mole fraction propylene in polymerization liquid.

the reaction rate constant varies, at otherwise equal conditions, with the I.V. of the polymer. The values in the table are adjusted to a constant I.V. of 2.0 dl./g.

TABLE 3

|  | $H_2O:AlEt_2Cl$ Mol Ratio | | | | | | |
|---|---|---|---|---|---|---|---|
|  | 0.02 | 0.05 | 0.10 | 0.15 | 0.20 | 0.30 | 0.40 |
| Reaction Rate Constant: | | | | | | | |
| Method of Example 1 | 900 | 820 | 720 | 610 | 500 | 350 | |
| Method of Example 2 | 920 | 880 | 820 | 770 | 700 | 600 | 500 |

TABLE 1

|  | $H_2O:AlEt_2Cl$ Ratio (molar) | | | | | |
|---|---|---|---|---|---|---|
|  | 0.02 | 0.05 | 0.1 | 0.15 | 0.2 | 0.25 |
| Isopentane Solubles | 5.6 | 4.3 | 3.4 | 3.3 | 3.5 | 3.9 |

Results of a similar series of polymerizations, carried out according to Example 2 but at three temperatures, are shown in Table 2. At 60° C. the minimum value of pentane solubles, 3.5%, accurs at a $H_2O:AlEt_2Cl$ ratio of 0.2. For 96% pentane insolubles, the useful range of water concentration is between about 0.13 and about 0.38.

With a polymerization temperature of 50° C., the minimum in isopentane insolubles, 2.95%, is also found at the ratio of 0.2. In this case, ratios between 0.075 and about 0.51 would lead to 96% or better isopentane insolubles.

With a polymerization temperature of 70° C., the minimum isopentane insolubles content of 4.9% was reached at 0.2–0.25 $H_2O:AlEt_2Cl$ ratio.

EXAMPLE 5

Effect of water on polymer molecular weight

A careful statistical analysis of the results of over 20 runs carried out in dry systems without water addition and 14 runs carried out with sufficient water addition, in the range from 2 to 9 p.p.m., to obtain the benefits of this invention showed no demonstrable effect of water addition on the molecular weight of the polymer.

In each instance, the actual I.V. of the polymer was compared with the "predicted" I.V., i.e., the value calculated from known correlations based on reaction conditions such as temperature and hydrogen concentration, but not including water concentration as a variable. The average deviation of actual from predicted I.V. was —0.03 for the runs with water present and —0.06 for the runs with a dry system. Considering the degree of accuracy of determination of reaction conditions and the fact that I.V. values are rounded off to the nearest tenth, the observed differences are not significant. There was no trend toward greater deviation from prediction at greater water concentrations in the studied range.

EXAMPLE 6

Repetition of Example 1 with substitution of aluminum diisobutyl chloride for aluminum diethyl chloride, on an

TABLE 2

|  | $H_2O:AlEt_2Cl$ Ratio (molar) | | | | | | | | |
|---|---|---|---|---|---|---|---|---|---|
|  | 0.02 | 0.05 | 0.1 | 0.15 | 0.2 | 0.25 | 0.3 | 0.4 | 0.5 |
| Isopentane Solubles—Polymerization Temperature: | | | | | | | | | |
| 50° C | | 4.4 | 3.6 | 3.1 | 2.95 | 3.0 | 3.1 | 3.4 | 3.9 |
| 60° C | 6.1 | 5.4 | 4.4 | 3.8 | 3.5 | 3.6 | 3.7 | 4.1 | 4.8 |
| 70° C | | 8.8 | 7.0 | 5.5 | 4.9 | 4.9 | 5.1 | 5.9 | 6.9 | equimolar basis, leads to production of polypropylene having a lower isopentane solubles content than obtained in a similar run in the absence of added water.

EXAMPLE 7

Repetition of Example 1 with substitution of titanium trichloride-aluminum chloride complex produced by reduction of $TiCl_4$ with aluminum metal leads to similarly good results.

In the description and examples, parts and percentages of ingredients of compositions are by weight, unless otherwise stated.

I claim as my invention:

1. A continuous process for producing highly crystalline polypropylene which comprises
   (1) preparing a reaction mixture comprising
      (a) liquid non-reactive hydrocarbon diluent,
      (b) propylene and polymer resulting from its polymerization, and,
      (c) a catalyst formed from between 25 p.p.m. and 1% by weight of titanium trichloride and the product formed during no more than 1 minute of contact of an aluminum dialkyl halide with from 0.09 to 1 mole of water per mole of aluminum dialkyl halide, the molar ratio of Al:Ti being between about 1:1 and about 5:1;
   (2) maintaining said reaction mixture at a temperature in the range from 0° C. to 120° C.;
   (3) continuously adding to said reaction mixture additional diluent, propylene, and catalyst ingredients; and
   (4) continuously withdrawing a portion of said reaction mixture, deactivating catalyst therein, and recovering polymer therefrom.

2. The process according to claim 1 wherein said titanium trichloride is the reaction product of titanium tetrachloride and an aluminum alkyl, said aluminum dialkyl halide is aluminum diethyl chloride, and the amount of water added is in the range from 0.2 to 1 mole per mole of aluminum diethyl chloride.

3. In the polymerization of propylene to stereoregular crystalline polypropylene by contact in inert hydrocarbon liquid with a catalyst formed from titanium trichloride and an aluminum alkyl compound, the improvement which consists of employing as said aluminum alkyl compound the product formed during no more than 1 minute of contact of an aluminum dialkyl halide with from 0.09 to 1 mole of water per mole of aluminum dialkyl halide.

4. The process according to claim 3 wherein said titanium trichloride is the reaction product of titanium tetrachloride and an aluminum alkyl, said aluminum dialkyl halide is aluminum diethyl chloride, and said ratio of water to aluminum diethyl chloride is in the range from 0.2 to 1.

5. The process according to claim 1 wherein said aluminum dialkyl halide is aluminum diethyl chloride.

6. The process according to claim 1 wherein said water is added directly to the reaction mixture.

7. A continuous process for producing highly crystalline polypropylene which comprises
   (1) maintaining in a reaction zone at a temperature of about 60° C. a polymerization reaction mixture consisting of solid polypropylene and catalyst in liquid hydrocarbon which boils below about 150° C.;
   (2) continuously introducing into said reaction zone
      (a) paraffinic hydrocarbon diluent which boils below about 150° C.,
      (b) propylene
      (c) titanium chloride complexed with aluminum chloride
      (d) aluminum diethyl chloride, and
      (e) a controlled amount of water, wherein the addition of components is controlled such that
         (i) the concentration of titanium trichloride in the reaction mixture is between about 25 p.p.m. and 1000 p.p.m.;
         (ii) the molar ratio of aluminum to titanium is between about 1:1 and 5:1, and
         (iii) the amount of water which enters the reaction zone is controlled, in the range from 0.09 to 0.3 mole per mole of aluminum dialkyl chloride, to be sufficient to react with only a portion of added aluminum diethyl chloride and to modify the catalytic properties of the catalyst to maintain a product crystallinity, as indicated by percent insoluble in isopentane, substantially in excess of that obtained by employing a substantially higher or a substantially lower amount of water at otherwise identical reaction conditions;
   (3) continuously withdrawing a portion of reaction mixture from said reaction zone;
   (4) deactivating residual catalyst in said portion;
   (5) removing residue of deactivated catalyst from said portion, and
   (6) recovering dry polypropylene from the substantially catalyst-free mixture of solid polymer and liquid hydrocarbon by subjecting it to vaporizing conditions, including temperatures below 160° C. but sufficiently high to permit said solvent to vaporize, and separating solid from vapor.

8. A process according to claim 1, wherein water is dissolved in the concentration of about 200 p.p.m. in a liquid hydrocarbon stream and a controlled portion of said stream is continuously added to said reaction mixture to provide said predetermined proportion of water therein.

9. A process according to claim 1, wherein said diluent boils below 50° C., and polymer is separated from reaction mixture by direct vaporization at a temperature below 140° C.

References Cited by the Examiner

UNITED STATES PATENTS 2,984,658  5/61  Seydel et al. _____ 260—94.9

JOSEPH L. SCHOFER, *Primary Examiner.*